United States Patent
Gady et al.

(10) Patent No.: US 7,858,060 B2
(45) Date of Patent: Dec. 28, 2010

(54) CURRENT STORAGE ESTIMATION FOR SELECTIVE CATALYTIC REDUCTION CATALYSTS

(75) Inventors: Kevin Andrew Gady, Ypsilanti, MI (US); Yong Miao, Ann Arbor, MI (US)

(73) Assignee: GM Global Technology Operations, Inc

( * ) Notice: Subject to any disclaimer, the term of this patent is extended or adjusted under 35 U.S.C. 154(b) by 0 days.

(21) Appl. No.: 12/418,031

(22) Filed: Apr. 3, 2009

(65) Prior Publication Data

US 2010/0028228 A1    Feb. 4, 2010

Related U.S. Application Data

(60) Provisional application No. 61/084,843, filed on Jul. 30, 2008.

(51) Int. Cl.
*B01D 53/94* (2006.01)
*G05D 7/00* (2006.01)

(52) U.S. Cl. .................. 423/213.5; 422/111

(58) Field of Classification Search ............... None
See application file for complete search history.

(56) References Cited

U.S. PATENT DOCUMENTS

| 6,981,368 B2 * | 1/2006 | van Nieuwstadt et al. ..... 60/277 |
| 7,559,194 B2 * | 7/2009 | Westerberg ................... 60/286 |
| 7,736,595 B2 | 6/2010 | Gady et al. |

OTHER PUBLICATIONS

U.S. Appl. No. 12/417,962, filed Apr. 3, 2009, Gady et al.

* cited by examiner

*Primary Examiner*—Melvin C Mayes
*Assistant Examiner*—Sheng H Davis (57) ABSTRACT

A dosing control system comprises a selective catalytic reduction (SCR) analysis module and a dosing management module. The SCR analysis module estimates an ammonia (NH3) slip rate downstream of an SCR catalyst, an NH3 conversion rate, an NH3 supply rate, and an NH3 oxidation rate. The SCR analysis module estimates an NH3 rate of change based on the NH3 slip, conversion, supply, and oxidation rates and estimates an NH3 storage change based on the NH3 rate of change. The SCR analysis module estimates NH3 stored by the SCR catalyst based on the NH3 storage change. The dosing management module controls dosing agent injection into an exhaust system upstream of the SCR catalyst based on the NH3 stored by the SCR catalyst.

26 Claims, 7 Drawing Sheets

CURRENT STORAGE ESTIMATION FOR SELECTIVE CATALYTIC REDUCTION CATALYSTS

CROSS-REFERENCE TO RELATED APPLICATIONS

This application claims the benefit of U.S. Provisional Application No. 61/084,843, filed on Jul. 30, 2008. The disclosure of the above application is incorporated herein by reference in its entirety.

This application is related to U.S. patent application Ser. No. 12/417,945 filed on Apr. 3, 2009 and Ser. No. 12/417,962 filed on Apr. 3, 2009. The disclosures of the above applications are incorporated herein by reference in their entirety.

FIELD

The present disclosure relates to engine systems and more particularly to exhaust treatment systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
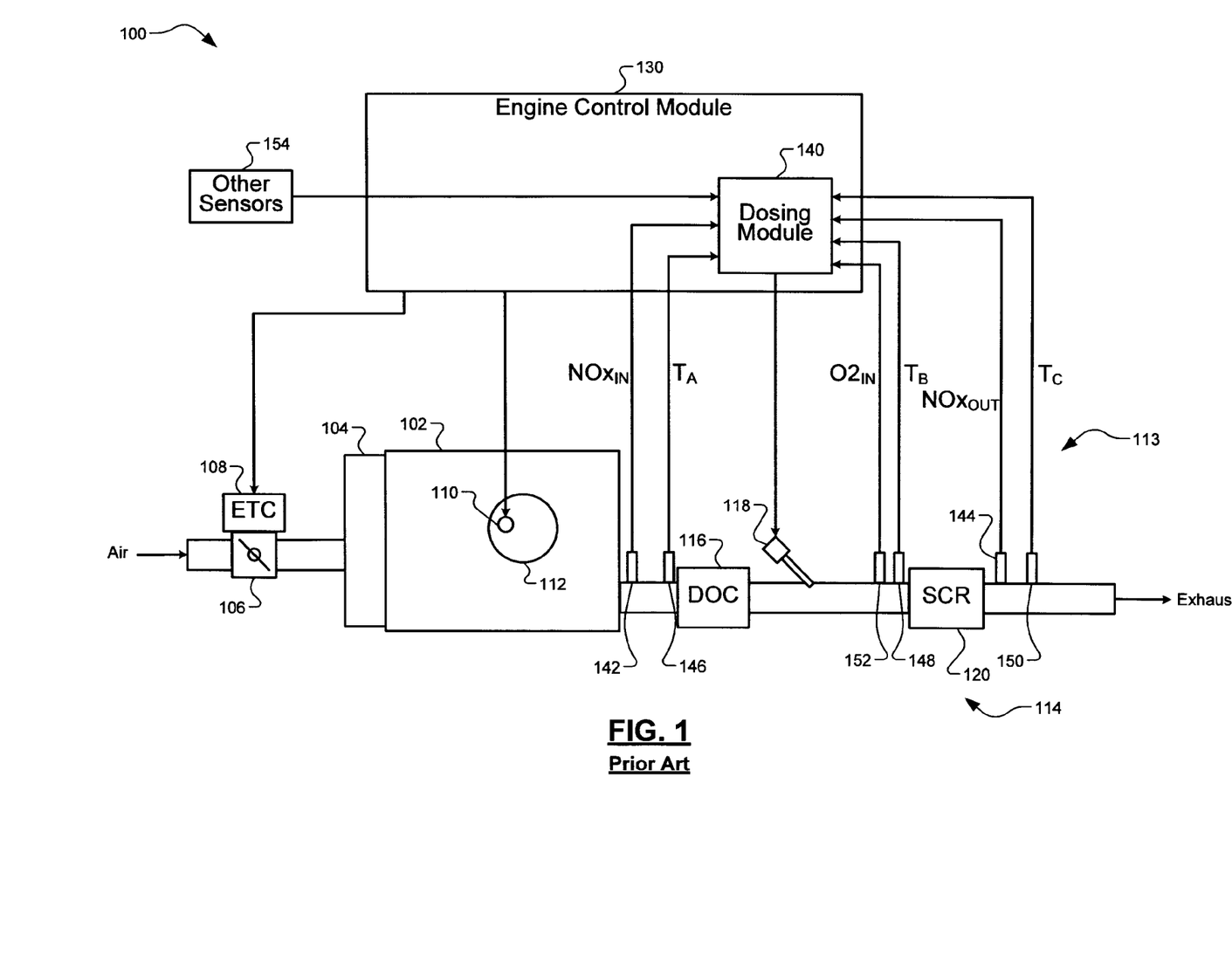
FIG. 1 is a functional block diagram of an engine system according to the prior art.

Referring now to FIG. 1, a functional block diagram of an engine system 100 is presented. Air is drawn into an engine 102 through an intake manifold 104. A throttle valve 106 controls airflow into the engine 102. An electronic throttle controller (ETC) 108 controls the throttle valve 106 and, therefore, the airflow into the engine 102. The air mixes with fuel from one or more fuel injectors 110 to form an air/fuel mixture. The air/fuel mixture is combusted within one or more cylinders of the engine 102, such as cylinder 112. Combustion of the air/fuel mixture generates torque.

Exhaust resulting from the combustion of the air/fuel mixture is expelled from the cylinders to an exhaust system 113. The exhaust may include particulate matter (PM) and gas. The exhaust gas includes nitrogen oxides (NOx), such as nitrogen oxide (NO) and nitrogen dioxide ($NO_2$). The exhaust system 113 includes a treatment system 114 that reduces the respective amounts of NOx and PM in the exhaust.

The treatment system 114 includes a diesel oxidation catalyst (DOC) 116, a dosing agent injector 118, and a selective catalytic reduction (SCR) catalyst 120. The exhaust flows from the engine 102 to the DOC 116. The DOC 116 removes hydrocarbons and/or carbon oxides from the exhaust. The dosing agent injector 118 injects a dosing agent into the exhaust stream, upstream of the SCR catalyst 120. $NH_3$ provided by the dosing agent is absorbed by the SCR catalyst 120. $NH_3$ reacts with NOx in the exhaust passing the SCR catalyst 120.

An engine control module (ECM) 130 controls the torque output of the engine 102. The ECM 130 includes a dosing module 140 that controls the mass flow rate of dosing agent injected by the dosing agent injector 118. In this manner, the dosing module 140 controls $NH_3$ supplied to the SCR catalyst 120. Specifically, the dosing module 140 controls $NH_3$ supplied to the SCR catalyst 120 to regulate the amount of oxygen stored by the SCR catalyst 120.

The dosing module 140 controls the mass flowrate of dosing agent injected based upon signals from various sensors. For example only, the sensors include: one or more NOx sensors, such as NOx sensors 142 and 144; one or more temperature sensors, such as temperature sensors 146, 148, and 150; and/or one or more oxygen sensors, such as oxygen sensor 152.

The dosing module 140 may control $NH_3$ supplied to the SCR catalyst 120 further based on signals from other sensors 154. For example only, the other sensors 154 may include a manifold absolute pressure (MAP) sensor, a mass air flow (MAF) sensor, a throttle position sensor (TPS), an intake air temperature (IAT) sensor, and/or other sensor(s).

The amount of $NH_3$ stored by the SCR catalyst 120 is referred to as current storage (mols). The percentage of NOx that is removed from the exhaust is referred to as the conversion efficiency or the NOx conversion rate. The NOx conversion rate is directly related to the current storage of the SCR catalyst 120. For example, the NOx conversion rate increases as the current storage of the SCR catalyst 120 increases. The dosing module 140 controls $NH_3$ supplied in a manner that maximizes the NOx conversion rate.

SUMMARY

A dosing control system comprises a selective catalytic reduction (SCR) analysis module and a dosing management module. The SCR analysis module estimates an ammonia (NH3) slip rate downstream of an SCR catalyst, an NH3 conversion rate, an NH3 supply rate, and an NH3 oxidation rate. The SCR analysis module estimates an NH3 rate of change based on the NH3 slip, conversion, supply, and oxidation rates and estimates an NH3 storage change based on the NH3 rate of change. The SCR analysis module estimates NH3 stored by the SCR catalyst based on the NH3 storage change. The dosing management module controls dosing agent injection into an exhaust system upstream of the SCR catalyst based on the NH3 stored by the SCR catalyst.

In other features, the SCR analysis module estimates an NH3 absorption rate and an NH3 desorption rate for upstream of the SCR catalyst and estimates the NH3 supply rate based on a dosing agent injection rate, the NH3 absorption rate, and the NH3 desorption rate.

In still other features, the SCR analysis module determines the NH3 supply rate based on a difference between the NH3 absorption rate and a sum of the dosing agent injection rate and the NH3 desorption rate.

In further features, the SCR analysis module estimates the NH3 absorption and desorption rates based on the dosing agent injection rate, an expected upstream NH3 absorption, an upstream NH3 time constant, and an amount of NH3 stored upstream of the SCR catalyst.

In still further features, the expected upstream NH3 absorption and the upstream NH3 time constant are determined based on an exhaust temperature measured upstream of the SCR catalyst and an exhaust flow rate.

In other features, the SCR analysis module estimates an NH3 absorption rate and an NH3 desorption rate for downstream of the SCR catalyst and estimates an NH3 output rate based on the NH3 slip, absorption, and desorption rates. The SCR analysis module estimates the NH3 rate of change based on the NH3 conversion, supply, oxidation, and output rates.

In still other features, the SCR analysis module estimates the NH3 output rate based on a difference between the NH3 absorption rate and a sum of the NH3 desorption and slip rates.

In further features, the SCR analysis module estimates the NH3 absorption and desorption rates based on the NH3 slip rate, an expected downstream NH3 desorption, a downstream NH3 time constant, and an amount of NH3 stored downstream of the SCR catalyst.

In still further features, the expected downstream NH3 desorption and the downstream NH3 time constant are determined based on an exhaust temperature measured downstream of the SCR catalyst and an exhaust flow rate.

In other features, the SCR analysis module estimates the NH3 conversion rate based on a temperature of the SCR catalyst, space velocity of the SCR catalyst, nitrogen oxides (NOx) upstream of the SCR catalyst, a ratio of nitrogen dioxide (NO2) to the NOx, and the NH3 stored by the SCR catalyst.

In still other features, the SCR analysis module estimates the NH3 oxidation rate based on a temperature of the SCR catalyst, oxygen upstream of the SCR catalyst, and the NH3 stored by the SCR catalyst.

In further features, the SCR analysis module estimates the NH3 slip rate based on a temperature of the SCR catalyst, space velocity of the SCR catalyst, the NH3 supply rate, and the NH3 stored by the SCR catalyst.

In still further features, the SCR analysis module estimates the NH3 rate of change based on a difference between the NH3 supply rate and a sum of the NH3 conversion, oxidation, and slip rates.

A dosing control method comprises: estimating an ammonia (NH3) slip rate downstream of a selective catalytic reduction (SCR) catalyst; estimating an NH3 conversion rate; estimating an NH3 supply rate; estimating an NH3 oxidation rate; estimating an NH3 rate of change based on the NH3 slip, conversion, supply, and oxidation rates; estimating an NH3 storage change based on the NH3 rate of change; estimating NH3 stored by the SCR catalyst based on the NH3 storage change. The dosing control method further comprises controlling dosing agent injection into an exhaust system upstream of the SCR catalyst based on the NH3 stored by the SCR catalyst.

In other features, the dosing control method further comprises estimating an NH3 absorption rate and an NH3 desorption rate for upstream of the SCR catalyst and estimating the NH3 supply rate based on a dosing agent injection rate, the NH3 absorption rate, and the NH3 desorption rate.

In still other features, the dosing control method further comprises determining the NH3 supply rate based on a difference between the NH3 absorption rate and a sum of the dosing agent injection rate and the NH3 desorption rate.

In further features, the dosing control method further comprises estimating the NH3 absorption and desorption rates based on the dosing agent injection rate, an expected upstream NH3 absorption, an upstream NH3 time constant, and an amount of NH3 stored upstream of the SCR catalyst.

In still further features, the dosing control method further comprises determining the expected upstream NH3 absorption and the upstream NH3 time constant based on an exhaust temperature measured upstream of the SCR catalyst and an exhaust flow rate.

In other features, the dosing control method further comprises estimating an NH3 absorption rate and an NH3 desorption rate for downstream of the SCR catalyst and estimating an NH3 output rate based on the NH3 slip, absorption, and desorption rates. The estimating the NH3 rate of change comprises estimating the NH3 rate of change based on the NH3 conversion, supply, oxidation, and output rates.

In still other features, the dosing control method further comprises estimating the NH3 output rate based on a difference between the NH3 absorption rate and a sum of the NH3 desorption and slip rates.

In further features, the dosing control method further comprises estimating the NH3 absorption and desorption rates based on the NH3 slip rate, an expected downstream NH3 desorption, a downstream NH3 time constant, and an amount of NH3 stored downstream of the SCR catalyst.

In still further features, the dosing control method further comprises determining the expected downstream NH3 desorption and the downstream NH3 time constant based on an exhaust temperature measured downstream of the SCR catalyst and an exhaust flow rate.

In other features, the dosing control method further comprises estimating the NH3 conversion rate based on a temperature of the SCR catalyst, space velocity of the SCR catalyst, nitrogen oxides (NOx) upstream of the SCR catalyst, a ratio of nitrogen dioxide (NO2) to the NOx, and the NH3 stored by the SCR catalyst.

In still other features, the dosing control method further comprises estimating the NH3 oxidation rate based on a temperature of the SCR catalyst, oxygen upstream of the SCR catalyst, and the NH3 stored by the SCR catalyst.

In further features, the dosing control method further comprises estimating the NH3 slip rate based on a temperature of the SCR catalyst, space velocity of the SCR catalyst, the NH3 supply rate, and the NH3 stored by the SCR catalyst.

In still further features, the dosing control method further comprises estimating the NH3 rate of change based on a difference between the NH3 supply rate and a sum of the NH3 conversion, oxidation, and slip rates.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A dosing control system according to the present disclosure controls the mass flowrate of dosing agent injected upstream of a selective catalytic reduction (SCR). The dosing control system controls the injection of dosing agent based on $NH_3$ stored by the SCR catalyst. The amount of $NH_3$ stored by the SCR catalyst is referred to as the current storage.

The dosing control system estimates a rate at which $NH_3$ is supplied to the SCR catalyst (i.e., $NH_3$ supply rate) and a rate at which stored $NH_3$ is removed from the SCR catalyst via reacting with NOx (i.e., $NH_3$ conversion rate). The dosing control system also estimates a rate of $NH_3$ oxidation (i.e., $NH_3$ oxidation rate) and the flow rate of $NH_3$ downstream of the SCR catalyst (i.e., $NH_3$ slip rate). The dosing control system determines the current storage based on the $NH_3$ supply rate, the $NH_3$ conversion rate, the $NH_3$ oxidation rate, and the $NH_3$ slip rate. The dosing control system may adjust the current storage based on upstream and downstream, absorption and desorption of $NH_3$.

Figure 2:
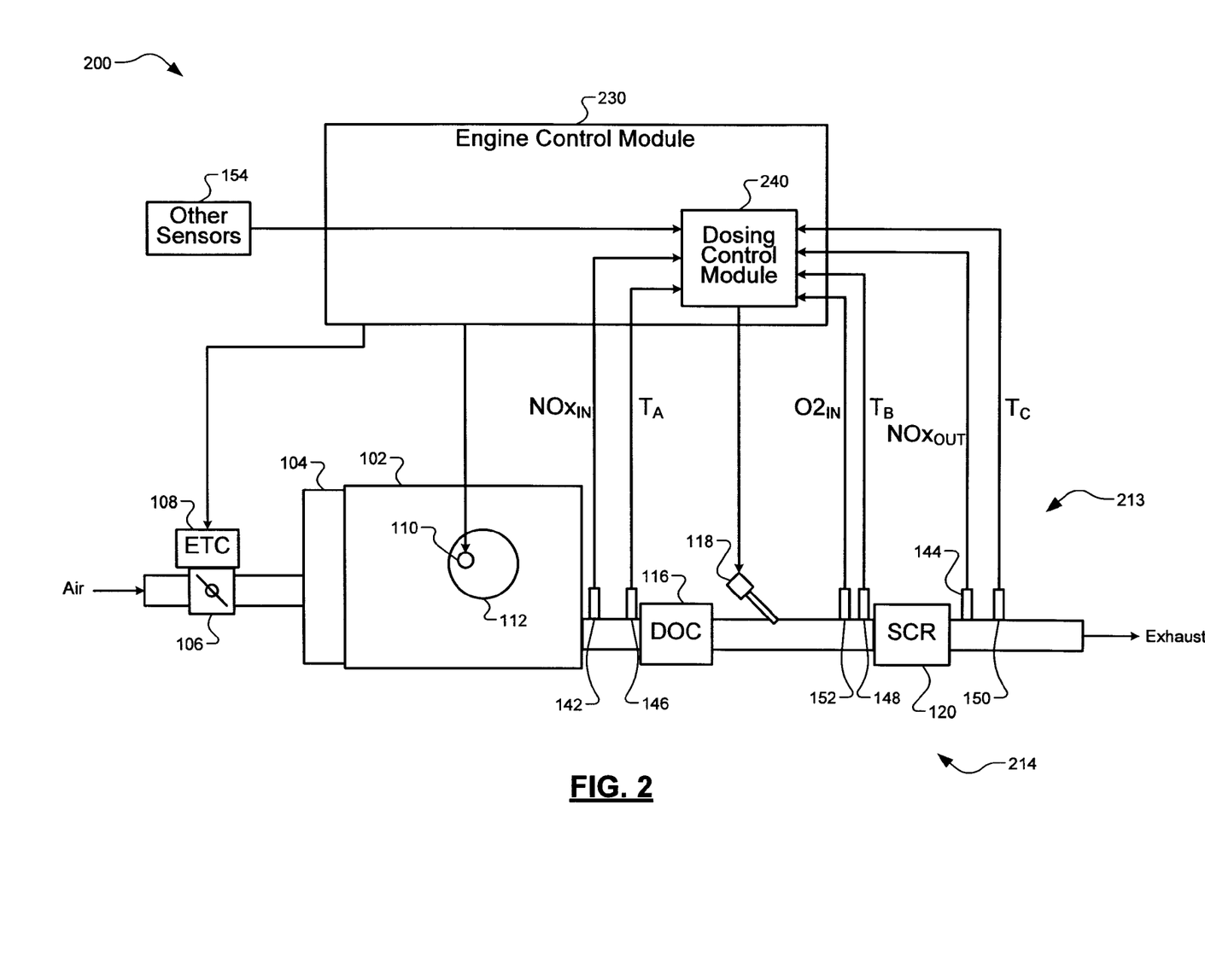
FIG. 2 is a functional block diagram of an exemplary engine system according to the principles of the present disclosure.

Referring now to FIG. 2, a functional block diagram of an exemplary engine system 200 is presented. The engine 102 may be, for example, a gasoline-type internal combustion engine, a diesel-type internal combustion engine, a hybrid-type engine, and/or another type of engine. The engine 102 generates torque by combusting an air/fuel mixture within cylinders of the engine 102. The engine 102 may include a plurality of cylinders, such as the cylinder 112. For example only, the engine 102 may include 2, 3, 4, 5, 6, 8, 10, or 12 cylinders. Combustion of the air/fuel mixture produces exhaust.

Exhaust produced through combustion of the air/fuel mixture is expelled from the cylinders to an exhaust system 213. The exhaust system 213 includes a treatment system 214 that reduces particulate matter (PM) and nitrogen oxides (NOx) in the exhaust. The treatment system 214 includes the diesel oxidation catalyst (DOC) 116, the dosing agent injector 118, and the SCR catalyst 120.

The dosing agent injector 118 injects a dosing agent into the exhaust stream, upstream of the SCR catalyst 120. The dosing agent may be urea ($CO(NH_2)_2$), ammonia ($NH_3$), and/or another dosing agent. In implementations where urea is injected, the urea reacts with the exhaust and results in $NH_3$. The dosing agent may in some instances be diluted with, for example, water ($H_2O$). In such implementations, heat from the exhaust gas evaporates the water, again resulting in $NH_3$. An exemplary chemical equation that is illustrative of the production of $NH_3$ from a dosing agent solution is provided below.

$$HCNO + H_2O \rightarrow NH_3 + CO_2$$

The SCR catalyst 120 stores (i.e., absorbs) $NH_3$ supplied by the dosing agent. For example only, the SCR catalyst 120 may include a vanadium catalyst and/or a zeolite catalyst. The SCR catalyst 120 may be implemented with a diesel particulate filter (DPF) or in another suitable configuration. An exemplary chemical equation that is illustrative of $NH_3$ absorption is provided below.

$$NH_3 + S \rightarrow NH_3(S)$$

The SCR catalyst 120 catalyzes a reaction between the stored $NH_3$ and NOx passing the SCR catalyst 120. The amount of $NH_3$ stored by the SCR catalyst 120 is referred to as current storage (mols). NOx and $NH_3$ react at a known rate, which is referred to as $k_{3OX}$. The reaction rate $k_{3OX}$ is described by the equation:

$$k_{3OX} = \frac{X \text{ mol } NH_3}{1 \text{ mol } NO_X},$$

where X varies depending on the amount of $NO_2$ in the exhaust. For example only, X varies between from 1.0 and 1.333.

The percentage of NOx that is removed from the exhaust via the NOx and $NH_3$ reaction is referred to as conversion efficiency or NOx conversion rate. The NOx conversion rate is directly related to the current storage of the SCR catalyst 120. For example only, the NOx conversion rate increases as the current storage increases.

The current storage of the SCR catalyst 120, however, is limited to a maximum amount of $NH_3$ (mols). This maximum amount of $NH_3$ is referred to as the maximum storage capacity of the SCR catalyst 120. Maintaining the current storage of the SCR catalyst 120 at the maximum storage capacity ensures that a maximum amount of NOx is removed from the exhaust. In other words, maintaining the current storage at the maximum storage capacity ensures that a maximum NOx conversion rate is achieved.

Maintaining the current storage at or near the maximum storage capacity also increases the possibility that $NH_3$ will be exhausted from the treatment system 214. This increased possibility may be attributable to the inverse relationship between the maximum storage capacity and the temperature of the SCR catalyst 120. For example, the maximum storage capacity decreases as the SCR temperature increases. A condition referred to as $NH_3$ slip occurs when $NH_3$ is exhausted from the exhaust system 213.

$NH_3$ desorbs (i.e., releases) from the SCR catalyst 120 when the SCR temperature increases at times when the current storage is equal to the maximum storage capacity. In other words, an increase in the SCR temperature causes a decrease in maximum storage capacity, and $NH_3$ stored in excess of this decreased maximum storage capacity is desorbed. Thus, an increase in the SCR temperature may cause $NH_3$ slip. An exemplary chemical equation that is illustrative of $NH_3$ desorption is provided below.

$$NH_3(S) \rightarrow NH_3 + S$$

All or a portion of $NH_3$ supplied by the dosing agent may oxidize before or after being absorbed by the SCR catalyst 120. For example, $NH_3$ may react with oxygen in the exhaust to produce nitrogen ($N_2$) and water ($H_2O$). $NH_3$ oxidation may be triggered by, for example, heat provided by the exhaust. An exemplary chemical equation that is illustrative of $NH_3$ oxidation is provided below.

$$4NH_3 + 3O_2 \rightarrow 2N_2 + 6H_2O$$

The $NH_3$ and NOx reaction produces nitrogen and water. Other components of the exhaust, such as oxygen ($O_2$), may also be involved in the $NH_3$ and NOx reaction. The exemplary chemical equations provided below are illustrative of the $NH_3$ and NOx reaction.

$$4NH_3 + 4NO + O_2 \rightarrow 4N_2 + 6H_2O$$

$$4NH_3 + 2NO + 2NO_2 \rightarrow 4N_2 + 6H_2O$$

$$8NH_3 + 6NO_2 \rightarrow 7N_2 + 12H_2O$$

The treatment system 214 includes the NOx sensors 142 and 144 and the temperature sensors 146, 148, and 150. The treatment system 214 also includes the oxygen sensor 152. The NOx sensor 142 is located upstream of the DOC 116, and the NOx sensor 144 is located downstream of the SCR catalyst 120. In other implementations, the NOx sensor 142 is located between the DOC 116 and the SCR catalyst 120.

The NOx sensors 142 and 144 measure NOx upstream and downstream of the SCR catalyst 120, respectively. In other words, the NOx sensors 142 and 144 measure NOx flowing in to and out of the SCR catalyst 120. The NOx sensors 142 and 144 generate signals corresponding to the concentration of NOx (ppm) at their respective locations, which are referred to as $NOx_{IN}$ and $NOx_{OUT}$, respectively.

The temperature sensors 146, 148, and 150 are located in various places throughout the exhaust system 213. For example only, as shown in FIG. 2, the temperature sensor 148 is located downstream of the DOC 116 and upstream of the SCR catalyst 120, and the temperature sensor 150 is located downstream of the SCR catalyst 120. The temperature sensor 146 is located upstream of the DOC 116. The temperature sensors 146, 148, and 150 each measure temperature of the exhaust at their respective locations and output a signal that corresponds to that measured temperature. The signals output by the temperature sensors 146, 148, and 150 are referred to as $T_A$, $T_B$, and $T_C$, respectively.

An engine control module (ECM) 230 controls the torque output of the engine 102. The ECM 230 includes a dosing control module 240 that controls the mass flow rate of dosing agent injected by the dosing agent injector 118. In this manner, the dosing control module 240 controls $NH_3$ supplied to the SCR catalyst 120. The mass flow rate of dosing agent supplied is referred to as $DA_{IN}$ (g/s), and the rate at which $NH_3$ is supplied to the SCR catalyst 120 is referred to as the $NH_3$ supply rate.

The dosing control module 240 controls the $DA_{IN}$ to maximize the NOx conversion rate and minimize $NH_3$ slip. The dosing control module 240 estimates the current storage of the SCR catalyst 120 based on the amount of $NH_3$ supplied to the SCR catalyst 120, $NH_3$ converted via reaction with NOx, $NH_3$ desorbed, $NH_3$ oxidized, and/or other parameter(s).

The dosing control module 240 also estimates the downstream concentration of NOx that will be measured by the NOx sensor 144 (i.e., $NOx_{OutPred}$). The dosing control module 240 uses this estimation of the downstream NOx with feedback from the NOx sensor 144. The NOx sensor 144, however, is cross-sensitive to $NH_3$. Thus, the $NOx_{OUT}$ includes measured NOx downstream of the SCR catalyst 120 and measured $NH_3$ downstream of the SCR catalyst 120.

The dosing control module 240 adjusts the $NOx_{OutPred}$ to account for the cross sensitivity of the NOx sensor 144. Additionally, the dosing control module 240 adjusts the $NOx_{OutPred}$ to account for the characteristics of the NOx sensor 144, such as the time constant of the NOx sensor 144. The $NOx_{OutPred}$ that is adjusted for the cross sensitivity of the NOx sensor 144 and the characteristics of the NOx sensor 144 is referred to as $NOx_{OutADJ}$.

The dosing control module 240 also delays the $NOx_{OutADJ}$ based on the time necessary for the exhaust to travel through the treatment system 214 to the location of the NOx sensor 144. This period of time is referred to as the transport delay (seconds). The dosing control module 240 stores the $NOx_{OutADJ}$ and delays use of the $NOx_{OutADJ}$ until the period of time corresponding to the transport delay has passed. In this manner, the dosing control module 240 refrains from using the $NOx_{OutADJ}$ with feedback from the NOx sensor 144 until the NOx sensor 144 produces the corresponding $NOx_{OUT}$ signal.

The dosing control module 240 determines an error term (i.e., $NOx_{ERR}$) based on the difference between the $NOx_{OutADJ}$ and $NOx_{OUT}$. The dosing control module 240 also determines possible sources of the $NOx_{ERR}$. For example only, the dosing control module 240 determines whether the $NOx_{ERR}$ is attributable to poisoning of the SCR catalyst 120, aging of the SCR catalyst 120, and/or inaccuracy in determining the current storage of the SCR catalyst 120. Other possible sources of the $NOx_{ERR}$ include, for example, inaccuracy in the adjustment of the $NOx_{OutPred}$, inaccuracy in determining $NH_3$ slip, and/or another source.

The dosing control module 240 selectively adjusts data, such as the current storage. The dosing control module 240 determines whether to adjust the current storage based on, for example, the $NOx_{ERR}$. If the dosing control module 240 determines to adjust the current storage, the dosing control module 240 determines whether the adjustment should be an increase or decrease and the magnitude of the adjustment. In this manner, the dosing control module 240 adjusts the current storage for future control of $NH_3$ supplied to the SCR catalyst 120 and/or the estimation of the NOx output. While the dosing control module 240 is shown as being located within the ECM 230, the dosing control module 240 may be located in other locations, such as external to the ECM 230.

Figure 3:
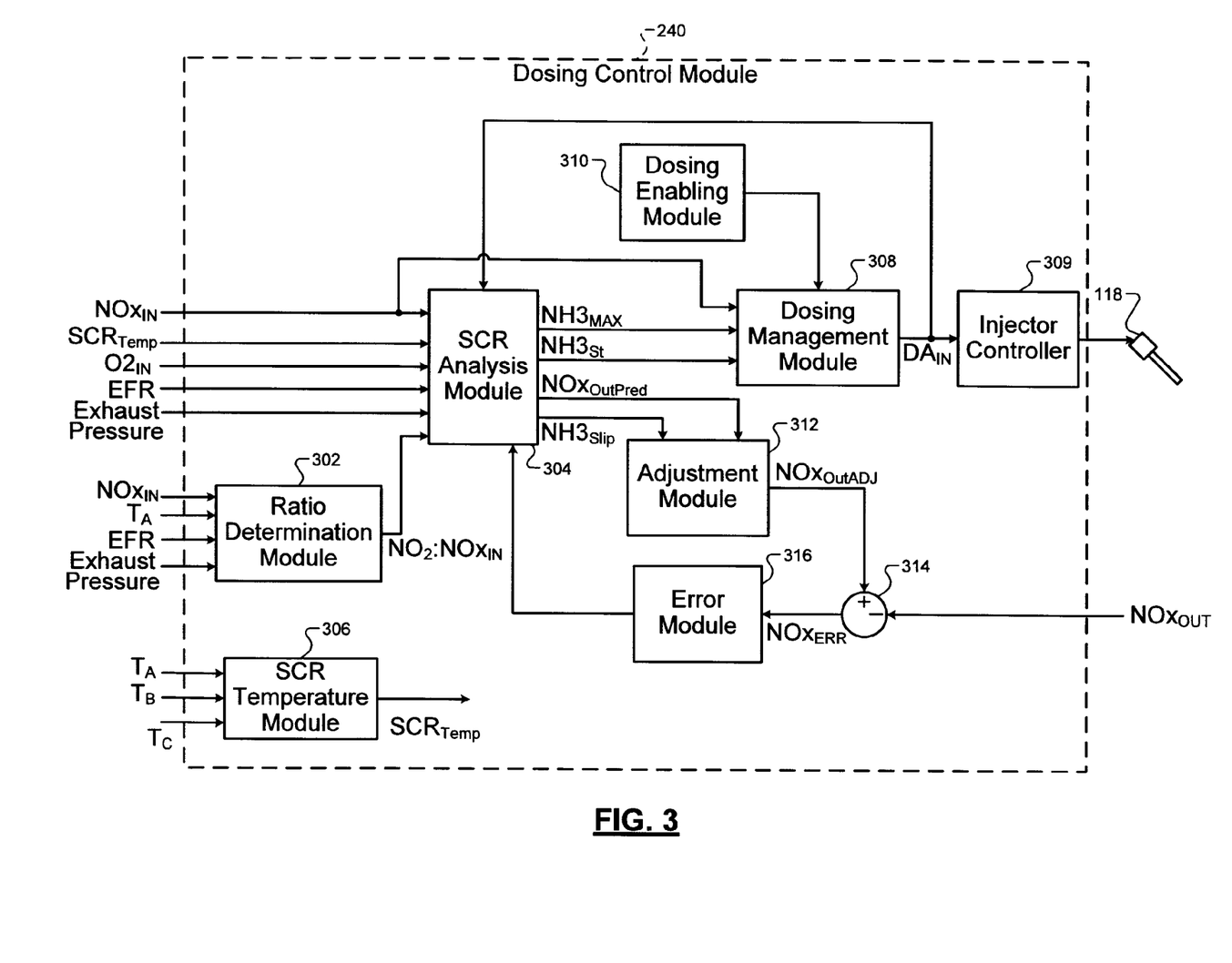
FIG. 3 is a functional block diagram of an exemplary dosing control module according to the principles of the present disclosure.

Referring now to FIG. 3, a functional block diagram of an exemplary implementation of the dosing control module 240 is presented. The dosing control module 240 includes a ratio determination module 302, an SCR analysis module 304, an SCR temperature module 306, a dosing management module 308, and a dosing enabling module 310. The dosing control module 240 also includes an adjustment module 312, a difference module 314, and an error module 316.

The ratio determination module 302 estimates the ratio of $NO_2$ in the NOx flowing into the SCR catalyst 120 and generates a $NO_2:NOx_{IN}$ signal accordingly. The ratio of $NO_2$ in the NOx flowing into the SCR catalyst 120 is referred to as the $NO_2$ ratio.

The ratio determination module 302 determines the $NO_2$ ratio based on the exhaust conditions and the $NOx_{IN}$. The exhaust conditions include, for example, exhaust pressure, exhaust temperature, exhaust flow rate (EFR), the air/fuel mixture, and/or other exhaust parameter(s). The exhaust pressure may be measured, for example, upstream of the DOC 116. The ratio determination module 302 may use, for example, the $T_A$ as the exhaust temperature. The EFR may be, for example, measured using a sensor (not shown) and/or determined based on the MAF into the engine 102.

The SCR analysis module 304 estimates various parameters related to control of $NH_3$ supplied to the SCR catalyst 120. For example only, the SCR analysis module 304 determines feed-forward parameters, such as the maximum storage capacity of the SCR catalyst 120 (i.e., $NH3_{Max}$) and the current storage of the SCR catalyst 120 (i.e., $NH3_{St}$). The SCR analysis module 304 also estimates various feed-back related parameters, such as the NOx downstream of the SCR catalyst 120 (i.e., $NOx_{OutPred}$) and $NH_3$ downstream of the SCR catalyst 120 (i.e., $NH3_{Slip}$).

The SCR analysis module 304 determines the maximum storage capacity of the SCR catalyst 120 based on the SCR temperature. For example, as the SCR temperature increases, the maximum storage capacity decreases. The SCR analysis module 304 may also determine the maximum storage capacity based on other parameters, such as the EFR.

The SCR temperature module 306 determines the SCR temperature based on the temperatures $T_A$, $T_B$, and/or $T_C$. The SCR temperature may also be determined based on the configuration of the SCR catalyst 120. For example, in some implementations, the SCR catalyst 120 is divided into sections. A buffer may be included with the SCR catalyst 120, such as between the sections and/or after the SCR catalyst 120. The SCR temperature module 306 may determine a temperature for each of the sections or a temperature profile for the temperature at various locations throughout the SCR catalyst 120.

The SCR analysis module 304 according to the principles of the present disclosure estimates the current storage of the SCR catalyst 120 and generates the $NH3_{St}$ signal accordingly. The current storage corresponds to the amount of $NH_3$ (mols) stored by the SCR catalyst 120. The SCR analysis module 304 may selectively set the current storage to a known value.

The SCR analysis module 304 thereafter determines a change in the current storage and adjusts the current storage accordingly. The SCR analysis module 304 determines the change in current storage based on $NH_3$ supplied to the SCR catalyst, $NH_3$ oxidized, $NH_3$ slip, $NH_3$ converted via reaction with NOx, and/or various other parameters. These parameters may include, for example, the SCR temperature, oxygen flowing into the SCR catalyst 120, the exhaust pressure, the space velocity of the SCR catalyst 120, the EFR, and/or other parameter(s).

The dosing management module 308 controls $NH_3$ supplied to the SCR catalyst 120 by controlling the mass flow rate of dosing agent injected (i.e., $DA_{IN}$)(g/s). The dosing management module 308 controls the $DA_{IN}$ based on the maximum storage capacity of the SCR catalyst 120, the current storage of the SCR catalyst 120, and the $NOx_{IN}$. The dosing management module 308 may also control the $DA_{IN}$ based on the $NO_2$ ratio. More specifically, the dosing management module 308 determines a set point for the current storage that will produce a maximum NOx conversion rate and minimize the potential for $NH_3$ slip. The dosing management module 308 controls $DA_{IN}$ based on the set point.

An injector controller or driver 309, receives $DA_{IN}$ and applies a signal to the dosing agent injector 118 based on the $DA_{IN}$. The signal applied to the dosing agent injector 118 may be any suitable type of signal. For example only, a PWM signal may be applied at a duty cycle (i.e., percentage of time ON during a predetermined period of time) that corresponds to the $DA_{IN}$. By controlling the $DA_{IN}$, the dosing management module 308 controls the supply of $NH_3$ to the SCR catalyst 120.

The dosing enabling module 310 selectively enables the dosing management module 308. Otherwise, the dosing management module 308 and, therefore, $NH_3$ supplied to the SCR catalyst 120, is disabled. For example only, the dosing enabling module 310 enables the dosing management module 308 when the exhaust temperature is greater than a predetermined temperature. When the exhaust temperature is less than this temperature, the dosing agent may be unable to convert into $NH_3$. Additionally, $NH_3$ stored by the SCR catalyst 120 may be unable to react with NOx when the exhaust temperature is less than the predetermined temperature.

The SCR analysis module 304 estimates the NOx that will be measured by the NOx sensor 144 and generates a $NOx_{OutPred}$ signal accordingly. The SCR analysis module 304 estimates the $NOx_{OutPred}$ based on the space velocity of the SCR catalyst 120 and the SCR temperature. The $NOx_{OutPred}$ may also be estimated based on the current storage of the SCR catalyst 120, the $NO_2$ ratio, and/or other parameter(s). The $NOx_{OutPred}$, however, does not account for the cross sensitivity of the NOx sensor 144. Additionally, the $NOx_{OutPred}$ does not account for the transport delay or the characteristics of the NOx sensor 144.

The SCR analysis module 304 estimates the $NH_3$ slip that will occur when the exhaust reaches the NOx sensor 144 and generates an $NH3_{Slip}$ signal accordingly. The estimated $NH_3$ slip will be used in adjusting the $NOx_{OutPred}$ for the cross sensitivity of the NOx sensor 144. The $NH_3$ slip may include $NH_3$ desorbed from the SCR catalyst 120, $NH_3$ that traverses the SCR catalyst 120 without being absorbed, and/or another source of $NH_3$ downstream of the SCR catalyst 120. The SCR analysis module 304 estimates the $NH_3$ slip based on the space velocity of the SCR catalyst 120, the SCR temperature, the current storage of the SCR catalyst 120, the maximum storage capacity of the SCR catalyst 120, and/or other parameter(s).

The adjustment module 312 adjusts the $NOx_{OutPred}$ for the cross sensitivity of the NOx sensor 144 and the characteristics of the NOx sensor 144. The adjusted $NOx_{OutPred}$ is referred to as $NOx_{OutADJ}$. The adjustment module 312 also delays use of the $NOx_{OutADJ}$ based on the transport delay and outputs the $NOx_{OutADJ}$ when the period of time corresponding to the transport delay has passed.

The difference module 314 receives the $NOx_{OUT}$ from the NOx sensor 144 and the $NOx_{OutADJ}$ from the adjustment module 312. The difference module 314 determines a NOx error term and generates a $NOx_{ERR}$ signal accordingly. The difference module 314 determines the NOx error term based on the difference between the $NOx_{OutADJ}$ and the $NOx_{OUT}$. For example only, the NOx error term may be determined as the $NOx_{OutADJ}$ less the $NOx_{OUT}$.

The error module 316 determines whether one or more parameters should be adjusted based on the $NOx_{ERR}$. The error module 316 may determine whether, for example, the current storage of the SCR catalyst 120 should be adjusted. For example only, the error module 316 may determine that the current storage should be adjusted when the $NOx_{ERR}$ is greater than a predetermined value.

The error module 316 determines the direction of the adjustment (e.g., increase or decrease) and the magnitude of the adjustment and adjusts the current storage accordingly. For example only, when the current storage is less than the maximum storage capacity, the $NH3_{Slip}$ is small or zero, and the $NOx_{ERR}$ is large, the error module 316 may increase the current storage. The large $NOx_{ERR}$ under these conditions may be attributable to the NOx sensor 144 measuring $NH_3$ slip, which occurs when the current storage is at the maximum storage capacity. For example only, the error module 316 may adjust the current storage based on the maximum storage capacity or the $NOx_{ERR}$.

Figure 4A:
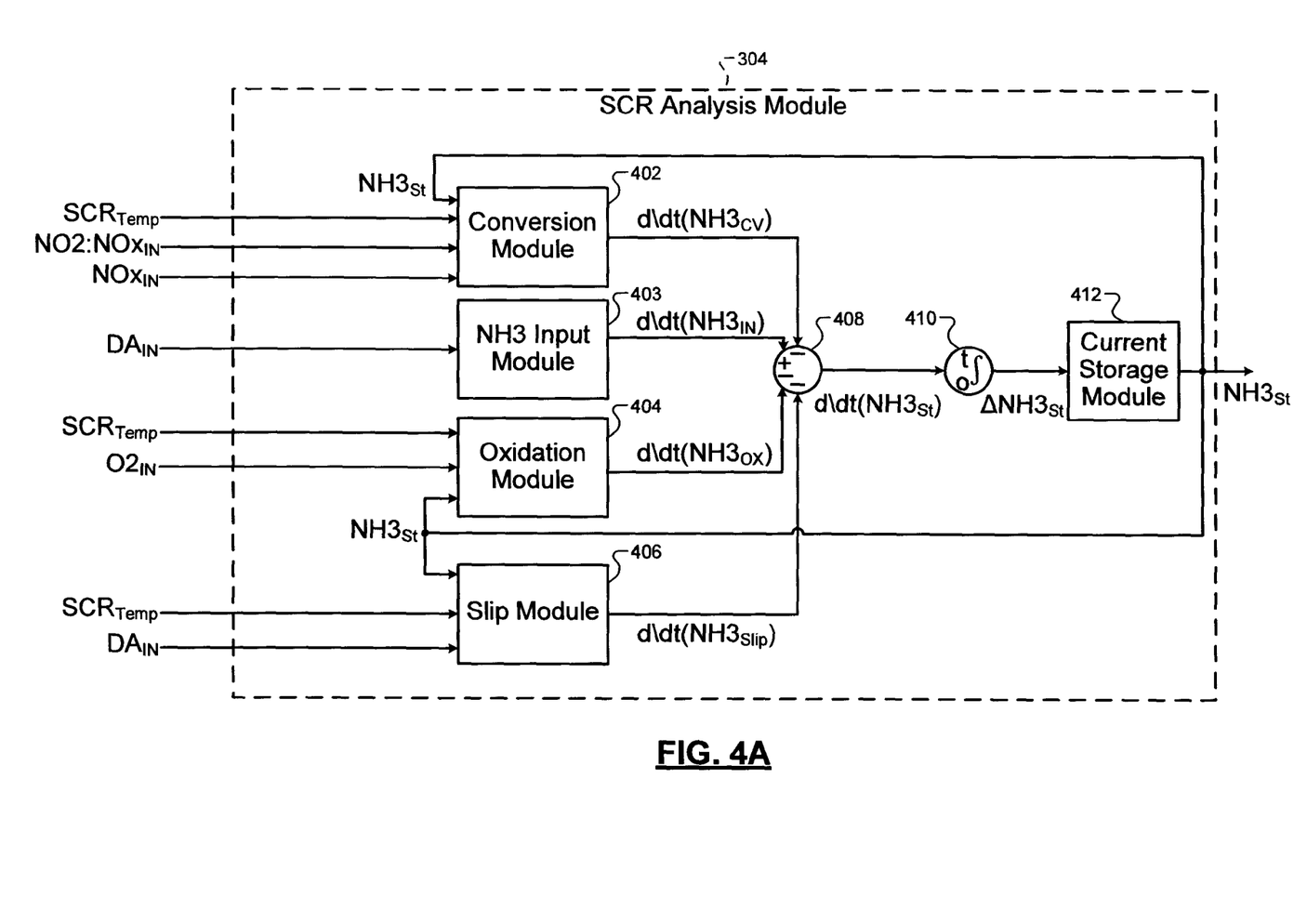
FIGS. 4A-4B are functional block diagrams of exemplary selective catalytic reduction (SCR) analysis modules according to the principles of the present disclosure.

Referring now to FIG. 4A, a functional block diagram of an exemplary implementation of the SCR analysis module 304 is presented. The SCR analysis module 304 includes a conversion module 402, an NH3 input module 403, an oxidation module 404, and a slip module 406. The SCR analysis module 304 also includes a summer module 408, an integrator module 410, and a current storage module 412.

The conversion module 402 determines the rate at which $NH_3$ is being converted via reaction with NOx and outputs a $d/dt(NH3_{CV})$ signal accordingly. In other words, the conversion module 402 determines the rate at which stored $NH_3$ is being removed from the SCR catalyst 120 due to NOx in the exhaust. The rate at which $NH_3$ is being converted or removed is referred to as the $NH_3$ conversion rate. The conversion module 402 determines the $NH_3$ conversion rate based on the SCR temperature, the space velocity of the SCR catalyst 120, the $NOx_{IN}$, the $NO_2$ ratio, and the current storage of the SCR catalyst 120.

The NH3 input module 403 determines the rate at which $NH_3$ is being supplied to the SCR catalyst 120 and generates a $d/dt(NH3_{IN})$ signal accordingly. The rate at which $NH_3$ is being supplied to the SCR catalyst 120 is referred to as the $NH_3$ supply rate. The NH3 input module 403 determines the $NH_3$ supply rate based on the $DA_{IN}$. The NH3 input module 403 may determine the $NH_3$ supply rate further based on exhaust conditions, such as the EFR and/or the $T_B$.

The oxidation module 404 estimates the rate at which $NH_3$ is being oxidized and outputs a $d/dt(NH3_{OX})$ signal accordingly. The rate at which $NH_3$ is oxidized is referred to as the $NH_3$ oxidation rate. $NH_3$ oxidation may occur before $NH_3$ is absorbed by the SCR catalyst 120 and/or while $NH_3$ is stored by the SCR catalyst 120. The oxidation module 404 determines the $NH_3$ oxidation rate based on the SCR temperature, oxygen into the SCR catalyst 120 (i.e., $O2_{IN}$), and the current storage of the SCR catalyst 120.

The slip module 406 estimates the rate of $NH_3$ slip downstream of the SCR catalyst 120 and outputs a $d/dt(NH3_{Slip})$ signal accordingly. The rate of $NH_3$ slip is referred to as the $NH_3$ slip rate. The slip module 406 determines the $NH_3$ slip rate based on the SCR temperature, the space velocity of the SCR catalyst 120, the $NH_3$ supply rate, and the current storage of the SCR catalyst 120. The slip module 406 may determine the $NH_3$ slip rate further based on the maximum storage capacity of the SCR catalyst 120.

The summer module 408 determines the rate of change of the current storage and outputs a $d/dt(NH3_{St})$ signal accordingly. The summer module 408 determines the rate of change of the current storage based on the $NH_3$ conversion rate, the $NH_3$ supply rate, the $NH_3$ oxidation rate, and the $NH_3$ slip rate. For example only, and as shown in FIG. 4A, the summer module 408 determines the rate of change of the current storage using the equation:

$$d/dt(NH3_{St}) = d/dt(NH3_{IN}) - d/dt(NH3_{OX}) - d/dt(NH3_{CV}) - d/dt(NH3_{Slip}),$$

where $d/dt(NH3_{St})$ is the rate of change of the current storage, $d/dt(NH3_{IN})$ is the $NH_3$ supply rate, $d/dt(NH3_{OX})$ is the $NH_3$ oxidation rate, $d/dt(NH3_{CV})$ is the $NH_3$ conversion rate, and $d/dt(NH3_{Slip})$ is the $NH_3$ slip rate.

The integrator module 410 determines a change in current storage of the SCR catalyst 120 based on the rate of change of the current storage and generates a $\Delta NH3$ signal accordingly. More specifically, the integrator module 410 determines the change in current storage based on an integral of the rate of change of the current storage over a period of time. The period of time may be a predetermined period of time, such as 100.0 ms.

The current storage module 412 determines the current storage of the SCR catalyst 120 based on the change in current storage. More specifically, the current storage module 412 stores the current storage of the SCR catalyst 120. The current storage may be selectively set to a known value, such as to the maximum storage capacity when $NH_3$ slip occurs. The current storage module 412 thereafter adjusts (i.e., updates) the current storage based on the change in current storage.

The exhaust system 213 or the treatment system 214 may also affect the current storage of the SCR catalyst 120 and/or the conversion of NOx. For example, various components of the exhaust system 213 such as exhaust pipes may absorb $NH_3$. This absorbed $NH_3$ desorbs at a later time. If unaccounted for, this absorption and desorption may affect various parameters calculated by the SCR analysis module 304, such as the current storage and the NOx conversion.

Figure 5A:
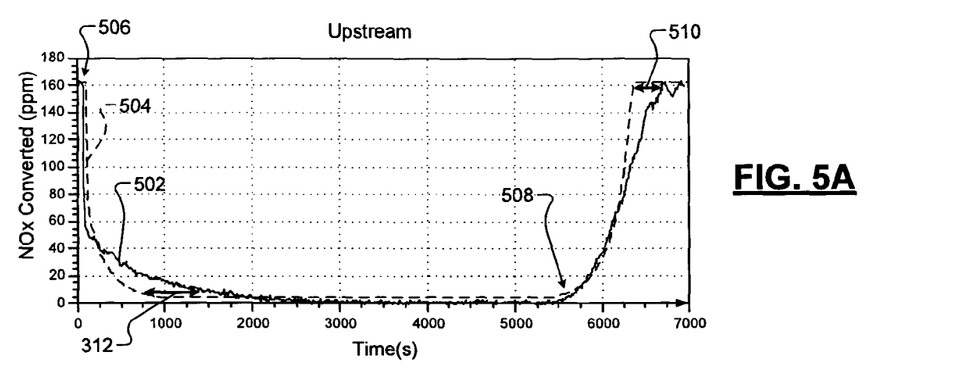
FIGS. 5A-5B are illustrations of absorption and desorption of $NH_3$ upstream and downstream of an SCR catalyst according to the principles of the present disclosure.

Referring now to FIG. 5A, an illustration of effects of upstream $NH_3$ absorption and desorption is presented. Trace 502 corresponds to a measured amount (ppm) of NOx at an outlet of the SCR catalyst 120. Dashed trace 504 corresponds to an exemplary amount (ppm) of NOx that is expected at the outlet of the SCR catalyst 120.

$DA_{IN}$ is increased and, therefore, the supply of $NH_3$ is increases at time 506. The SCR analysis module 304, therefore, expects that the amount of NOx converted will increase until the $NH_3$ current storage of the SCR catalyst 120 reaches the maximum storage capacity. The expected NOx trace 504 decreases and reaches approximately 0.0 ppm at approximately time 750 s.

The measured NOx trace 502, however, deviates from the expected NOx trace 504 and decreases at a slower rate. This deviation may be attributable to absorption of $NH_3$ upstream of the SCR catalyst 120, which results in a lesser amount of $NH_3$ available for NOx conversion at the SCR catalyst 120.

$DA_{IN}$ is disabled and the supply of $NH_3$ to the SCR catalyst 120 is stopped at time 508. The expected NOx trace 504 increases as the current storage of the SCR catalyst 120 decreases. The measured NOx trace 502, however, deviates from the expected NOx trace 504 and increases at a slower rate, as shown by arrow 510. This deviation and slower increase in NOx at the outlet of the SCR catalyst 120 may be attributable to $NH_3$ desorption upstream of the SCR catalyst 120.

Figure 5B:
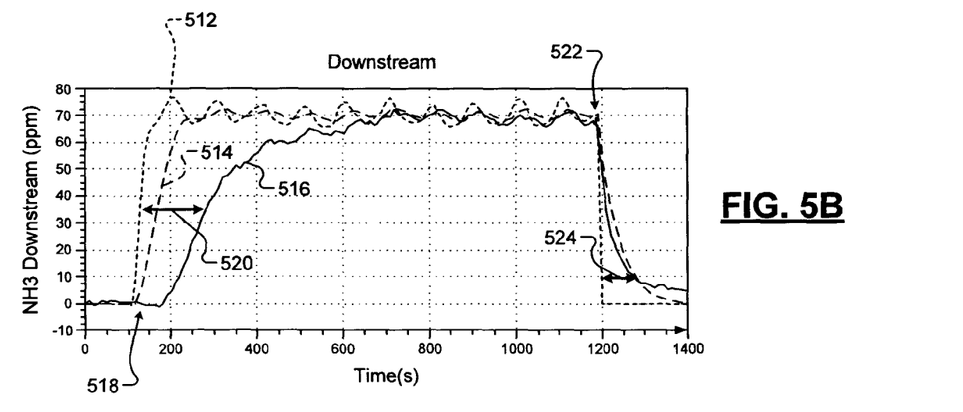

Referring now to FIG. 5B, an illustration of effects of downstream absorption and desorption of $NH_3$ is presented. Dashed trace 512 corresponds to an expected amount of $NH_3$ slip (ppm) for a treatment system including the SCR catalyst 120. Dashed trace 514 corresponds to an expected amount of $NH_3$ slip (ppm) for a treatment system including the SCR catalyst 120 and a buffer. Trace 516 corresponds to an exemplary measured amount (ppm) of $NH_3$ slip.

$NH_3$ is supplied to the SCR catalyst 120 in excess of the maximum storage capacity at 518. Thus, the expected $NH_3$ slip traces 512 and 514 increase. The measured $NH_3$ slip trace 516, however, deviates and increases at a slower rate than the expected $NH_3$ slip traces 512 and 514, as shown by arrow 520. This deviation in $NH_3$ slip may be attributable to absorption of $NH_3$ downstream of the SCR catalyst 120 and upstream of the location at which the $NH_3$ slip is measured.

$DA_{IN}$ is disabled and, therefore, the supply of $NH_3$ is disabled at 522. The expected $NH_3$ slip traces 512 and 514 and the measured $NH_3$ slip trace 516 therefore decrease. The measured $NH_3$ slip trace 516, however, decreases at slower rate than the expected $NH_3$ slip trace 512, as shown by arrow 524. This slower rate of decrease may be attributable to $NH_3$ desorption from locations downstream of the SCR catalyst 120 and upstream of the location at which the $NH_3$ slip is measured.

Figure 4B:
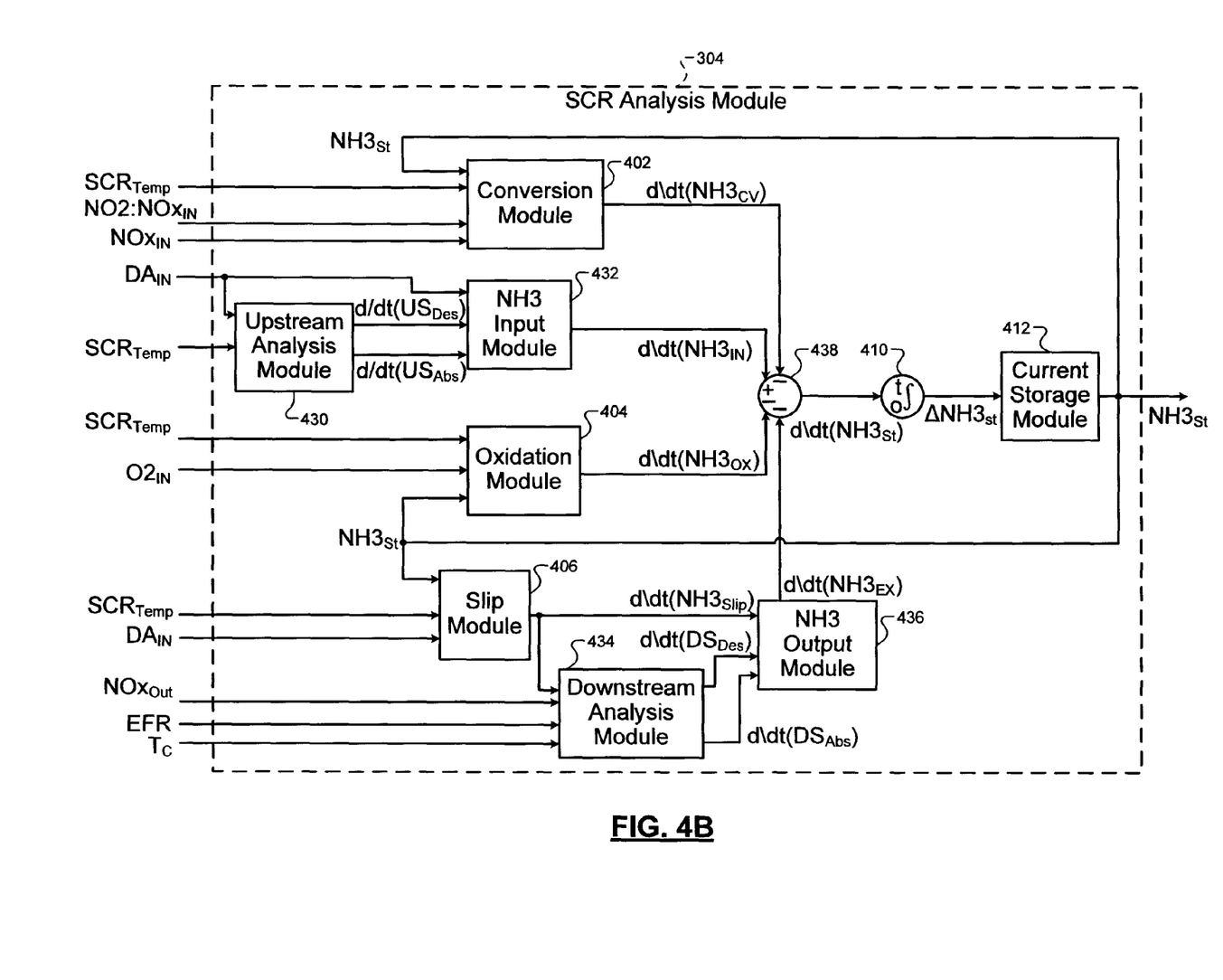

Referring now to FIG. 4B, a functional block diagram of another exemplary implementation of the SCR analysis module 304 is presented. The SCR analysis module 304 of FIG. 4B adjusts the current storage based on upstream $NH_3$ absorption, upstream $NH_3$ desorption, downstream $NH_3$ absorption, and downstream $NH_3$ desorption.

The SCR analysis module 304 includes the conversion module 402, the oxidation module 404, the slip module 406, the integrator module 410, and the current storage module 412. The SCR analysis module 304 of FIG. 4B also includes an upstream analysis module 430, an NH3 input module 432, a downstream analysis module 434, an NH3 output module 436, and a summer module 438.

The upstream analysis module 430 determines a rate of $NH_3$ absorption upstream of the SCR catalyst 120 and a rate of $NH_3$ desorption upstream of the SCR catalyst 120. The rate of absorption is referred to as the upstream absorption rate and the rate of desorption is referred to as the upstream desorption rate.

The upstream analysis module 430 generates a $d/dt(US_{Abs})$ signal and a $d/dt(US_{Des})$ signal based on the upstream absorption rate and the upstream desorption rate, respectively. For example only, the upstream analysis module 430 may determine the upstream absorption rate and the upstream desorption rate using the equations:

$$d/dt(US_{Abs}) = X_{US} * DA_{IN} - (1/\tau_{US}) * NH3_{US}; \text{ and}$$

$$d/dt(US_{Des}) = (1-X_{US}) * DA_{IN} + (1/\tau_{US}) * NH3_{US},$$

where $X_{US}$ is a percentage of the injected $NH_3$ that is expected to absorb upstream of the SCR catalyst 120, $\tau_{US}$ is a time constant for $NH_3$ desorption upstream of the SCR catalyst 120, and $NH3_{US}$ is a quantity of $NH_3$ stored upstream of the SCR catalyst 120.

The upstream analysis module 430 determines the $X_{US}$ and the $\tau_{US}$ based on the $T_A$ and the EFR. For example only, the upstream analysis module 430 may determine the $X_{US}$ and the $\tau_{US}$ from lookup tables indexed by the $T_A$ and/or the EFR.

The NH3 input module 432 determines the $NH_3$ supply rate and generates the $d/dt(NH3_{IN})$ signal accordingly. The NH3 input module 432 determines the $NH_3$ supply rate based on the $DA_{IN}$, the $d/dt(US_{Abs})$, and the $d/dt(US_{Des})$. For example only, the NH3 input module 432 may determine the $NH_3$ supply rate based on the $d/dt(US_{Abs})$ subtracted from a sum of the $DA_{IN}$ and the $d/dt(US_{Des})$.

Similar to the upstream absorption and desorption of the treatment system 214, $NH_3$ also absorbs and desorbs downstream of the SCR catalyst 120. The downstream analysis module 434 determines a rate of $NH_3$ absorption downstream of the SCR catalyst 120 and a rate of $NH_3$ desorption downstream of the SCR catalyst 120. The rate of absorption is referred to as the downstream absorption rate, and the rate of desorption is referred to as the downstream desorption rate.

The downstream analysis module 434 generates a $d/dt(DS_{Abs})$ signal and a $d/dt(DS_{Des})$ signal based on the downstream absorption rate and the downstream desorption rate, respectively. For example only, the downstream analysis module 434 may determine the downstream absorption rate and the downstream desorption rate using the equations:

$$d/dt(DS_{Abs}) = X_{DS} d/dt(NH3_{Slip}) - (1/\tau_{DS})NH3_{DS}; \text{ and}$$

$$d/dt(DS_{Des}) = (1-X_{DS}) * d/dt(NH3_{Slip}) + (1/\tau_{DS}) * NH3_{DS},$$

where $X_{DS}$ is a percentage of the $NH3_{Slip}$ that is expected to absorb downstream of the SCR catalyst 120, $\tau_{DS}$ is a time constant for $NH_3$ desorption downstream of the SCR catalyst 120, and $NH3_{DS}$ is a quantity of $NH_3$ stored downstream of the SCR catalyst 120. In various implementations, the $d/dt(DS_{Abs})$ and the $d/dt(DS_{Des})$ may be determined relative to a predetermined location, such as the location of the NOx sensor 144 or the location at which the $NH3_{Slip}$ is measured.

The downstream analysis module 434 determines the $X_{DS}$ and the $\tau_{DS}$ based on the $T_C$ and the EFR. For example only, the downstream analysis module 434 may determine the $X_{DS}$ and the $\tau_{DS}$ from lookup tables indexed by the $T_C$ and/or the EFR.

The NH3 output module 436 determines the molar flowrate of $NH_3$ exiting the treatment system 214 and generates a $d/dt(NH3_{EX})$ signal accordingly. The NH3 output module 436 determines the molar flowrate of $NH_3$ exiting the treatment system 214 based on the $d/dt(NH3_{Slip})$, the $d/dt(DS_{Des})$, and the $d/dt(DS_{Abs})$. For example only, the NH3 output module 436 may determine the molar flowrate of $NH_3$ exiting the treatment system 214 based on the $d/dt(DS_{Abs})$ subtracted from a sum of the $d/dt(NH3_{Slip})$ and the $d/dt(DS_{Des})$.

The summer module 438 determines the rate of change of the current storage and generates the $d/dt(NH3_{St})$ signal accordingly. The summer module 438 determines the rate of change of the current storage based on the $d/dt(NH3_{CV})$, the $d/dt(NH3_{IN})$, the $d/dt(NH3_{OX})$, and the $d/dt(NH3_{EX})$. For example only, and as shown in FIG. 4B, the summer module 438 determines the rate of change of the current storage using the equation:

$$d/dt(NH3_{St}) = d/dt(NH3_{IN}) - d/dt(NH3_{OX}) - d/dt(NH3_{CV}) - d/dt(NH3_{EX}),$$

where $d/dt(NH3_{St})$ is the rate of change of the current storage, $d/dt(NH3_{IN})$ is the $NH_3$ supply rate, $d/dt(NH3_{OX})$ is the $NH_3$ oxidation rate, $d/dt(NH3_{CV})$ is the $NH_3$ conversion rate, and $d/dt(NH3_{EX})$ is the molar flow rate of $NH_3$ exiting the treatment system 214.

The integrator module 410 outputs the change in current storage of the SCR catalyst 120 based on the rate of change of the current storage and generates the $\Delta NH3$ signal accordingly. For example only, the integrator module 410 integrates the rate of change of the current storage over a period of time. The period of time may be a predetermined period of time, such as 100.0 ms. The current storage module 412 determines the current storage of the SCR catalyst 120 based on the change in current storage.

Figure 6:
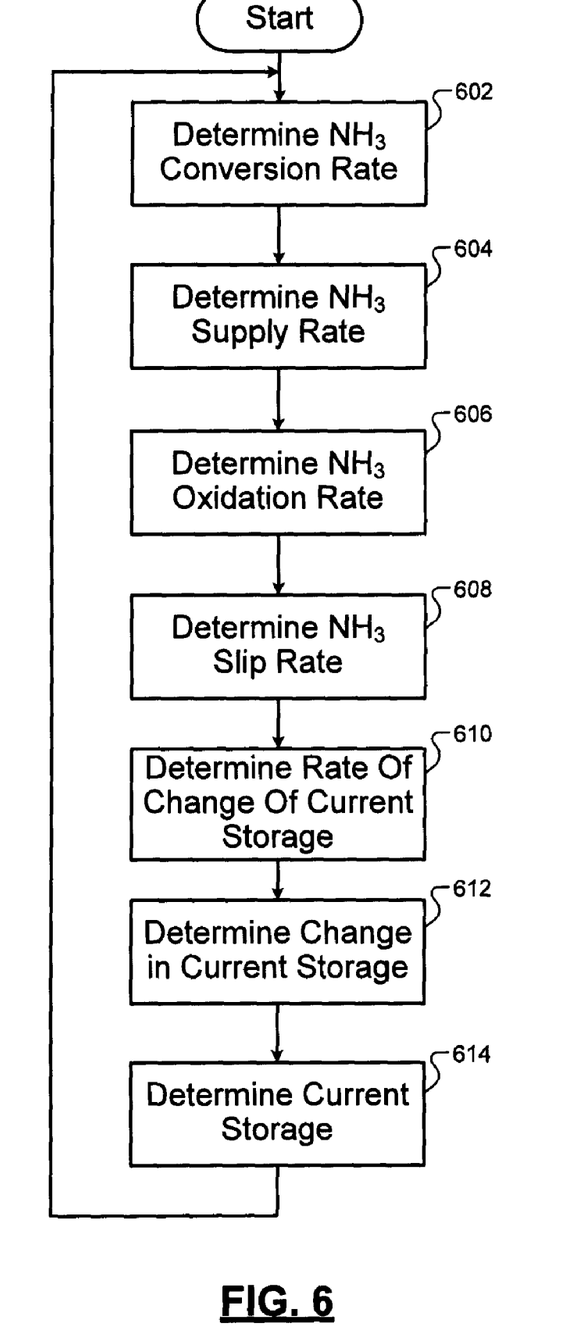
FIG. 6 is a flowchart depicting exemplary steps performed by SCR analysis modules according to the principles of the present disclosure.

Referring now to FIG. 6, a flowchart depicting exemplary steps performed by SCR analysis modules is presented. The steps of FIG. 6 may be performed in a different order without altering the principles of the present application. Control may complete the steps of FIG. 6 at a predetermined rate, such as once every 100.0 ms.

Control begins in step 602 where control determines the $NH_3$ conversion rate (i.e., $d/dt(NH3_{CV})$). Control determines the $NH_3$ conversion rate based on the SCR temperature, the space velocity of the SCR catalyst 120, the $NOx_{IN}$, the $NO_2$ ratio, and the current storage of the SCR catalyst 120. In step 604, control determines the $NH_3$ supply rate (i.e., $d/dt(NH3_{IN})$). Control determines the $NH_3$ supply rate based on the mass flow rate of dosing agent injected. Control may also determine $NH_3$ supply rate based on the upstream $NH_3$ absorption and/or upstream $NH_3$ desorption.

In step 606, control determines the $NH_3$ oxidation rate. Control determines the $NH_3$ oxidation rate based on the SCR temperature, the oxygen into the SCR catalyst 120, and the current storage of the SCR catalyst 120. Control determines the $NH_3$ slip rate (i.e., $d/dt(NH3_{Slip})$) in step 608. Control determines the $NH_3$ slip rate based on the SCR temperature, the space velocity of the SCR catalyst 120, the $NH_3$ supply rate, and the current storage of the SCR catalyst 120.

In other implementations, control may also determine the rate of $NH_3$ exiting the treatment system 214 (i.e., $d/dt(NH3_{EX})$). In such implementations, control determines the $NH_3$ downstream desorption rate (i.e., the $d/dt(DS_{Des})$) and/or the $NH_3$ downstream absorption rate (i.e., the $d/dt(DS_{Abs})$). Control determines the rate of $NH_3$ exiting the treatment system 214 based on the $NH_3$ slip rate, the $NH_3$ downstream desorption rate, and the $NH_3$ downstream absorption rate.

Control determines the rate of change of the current storage (i.e., $d/dt(NH3_{St})$) in step 610. For example only, control determines the rate of change of the current storage using the equation:

$$d/dt(NH3_{St})=d/dt(NH3_{IN})-d/dt(NH3_{OX})-d/dt(NH3_{CV})-d/dt(NH3_{Slip}),$$

where $d/dt(NH3_{St})$ is the rate of change of the current storage, $d/dt(NH3_{IN})$ is the NH$_3$ supply rate, $d/dt(NH3_{OX})$ is the NH$_3$ oxidation rate, $d/dt(NH3_{CV})$ is the NH$_3$ conversion rate, and $d/dt(NH3_{Slip})$ is NH$_3$ slip rate.

In implementations where control determines the rate of NH$_3$ exiting the treatment system 214, control may determine the rate of change of the current storage using the equation:

$$d/dt(NH3_{St})=d/dt(NH3_{IN})-d/dt(NH3_{OX})-d/dt(NH3_{CV})-d/dt(NH3_{EX}),$$

where $d/dt(NH3_{St})$ is the rate of change of the current storage, $d/dt(NH3_{IN})$ is the NH$_3$ supply rate, $d/dt(NH3_{OX})$ is the NH$_3$ oxidation rate, $d/dt(NH3_{CV})$ is the NH$_3$ conversion rate, and $d/dt(NH3_{EX})$ is the molar flow rate of NH$_3$ exiting the treatment system 214.

In step 612, control determines the change in current storage of the SCR catalyst 120 (i.e., ΔNH3) based on the rate of change of the current storage. For example only, control determines the change in current storage based on the integral of the rate of change of the current storage over a period of time. The period of time may be a predetermined period of time, such as 100.0 ms.

Control determines the current storage of the SCR catalyst 120 based on the change in current storage in step 614. For example, control may adjust the stored current storage based on the change in current storage in step 614. Control then returns to step 602.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dosing control system comprising:
   a selective catalytic reduction (SCR) analysis module that estimates an ammonia (NH3) slip rate downstream of an SCR catalyst, an NH3 conversion rate, an NH3 supply rate, and an NH3 oxidation rate, that estimates an NH3 rate of change based on said NH3 slip, conversion, supply, and oxidation rates, that estimates an NH3 storage change based on said NH3 rate of change, and that estimates NH3 stored by said SCR catalyst based on said NH3 storage change; and
   a dosing management module that controls dosing agent injection into an exhaust system upstream of said SCR catalyst based on said NH3 stored by said SCR catalyst.

2. The dosing control system of claim 1 wherein said SCR analysis module estimates an NH3 absorption rate and an NH3 desorption rate for upstream of said SCR catalyst and estimates said NH3 supply rate based on a dosing agent injection rate, said NH3 absorption rate, and said NH3 desorption rate.

3. The dosing control system of claim 2 wherein said SCR analysis module determines said NH3 supply rate based on a difference between said NH3 absorption rate and a sum of said dosing agent injection rate and said NH3 desorption rate.

4. The dosing control system of claim 2 wherein said SCR analysis module estimates said NH3 absorption and desorption rates based on said dosing agent injection rate, an expected upstream NH3 absorption, an upstream NH3 time constant, and an amount of NH3 stored upstream of said SCR catalyst.

5. The dosing control system of claim 4 wherein said expected upstream NH3 absorption and said upstream NH3 time constant are determined based on an exhaust temperature measured upstream of said SCR catalyst and an exhaust flow rate.

6. The dosing control system of claim 1 wherein said SCR analysis module estimates an NH3 absorption rate and an NH3 desorption rate for downstream of said SCR catalyst and estimates an NH3 output rate based on said NH3 slip, absorption, and desorption rates,
   wherein said SCR analysis module estimates said NH3 rate of change based on said NH3 conversion, supply, oxidation, and output rates.

7. The dosing control system of claim 6 wherein said SCR analysis module estimates said NH3 output rate based on a difference between said NH3 absorption rate and a sum of said NH3 desorption and slip rates.

8. The dosing control system of claim 6 wherein said SCR analysis module estimates said NH3 absorption and desorption rates based on said NH3 slip rate, an expected downstream NH3 desorption, a downstream NH3 time constant, and an amount of NH3 stored downstream of said SCR catalyst.

9. The dosing control system of claim 8 wherein said expected downstream NH3 desorption and said downstream NH3 time constant are determined based on an exhaust temperature measured downstream of said SCR catalyst and an exhaust flow rate.

10. The dosing control system of claim 1 wherein said SCR analysis module estimates said NH3 conversion rate based on a temperature of said SCR catalyst, space velocity of said SCR catalyst, nitrogen oxides (NOx) upstream of said SCR catalyst, a ratio of nitrogen dioxide (NO2) to said NOx, and said NH3 stored by said SCR catalyst.

11. The dosing control system of claim 1 wherein said SCR analysis module estimates said NH3 oxidation rate based on a temperature of said SCR catalyst, oxygen upstream of said SCR catalyst, and said NH3 stored by said SCR catalyst.

12. The dosing control system of claim 1 wherein said SCR analysis module estimates said NH3 slip rate based on a temperature of said SCR catalyst, space velocity of said SCR catalyst, said NH3 supply rate, and said NH3 stored by said SCR catalyst.

13. The dosing control system of claim 1 wherein said SCR analysis module estimates said NH3 rate of change based on a difference between said NH3 supply rate and a sum of said NH3 conversion, oxidation, and slip rates.

14. A dosing control method comprising:
   estimating an ammonia (NH3) slip rate downstream of a selective catalytic reduction (SCR) catalyst;
   estimating an NH3 conversion rate;
   estimating an NH3 supply rate;
   estimating an NH3 oxidation rate;
   estimating an NH3 rate of change based on said NH3 slip, conversion, supply, and oxidation rates;
   estimating an NH3 storage change based on said NH3 rate of change;
   estimating NH3 stored by said SCR catalyst based on said NH3 storage change; and
   controlling dosing agent injection into an exhaust system upstream of said SCR catalyst based on said NH3 stored by said SCR catalyst.

15. The dosing control method of claim 14 further comprising:
- estimating an NH3 absorption rate and an NH3 desorption rate for upstream of said SCR catalyst; and
- estimating said NH3 supply rate based on a dosing agent injection rate, said NH3 absorption rate, and said NH3 desorption rate.

16. The dosing control method of claim 15 further comprising determining said NH3 supply rate based on a difference between said NH3 absorption rate and a sum of said dosing agent injection rate and said NH3 desorption rate.

17. The dosing control method of claim 15 further comprising estimating said NH3 absorption and desorption rates based on said dosing agent injection rate, an expected upstream NH3 absorption, an upstream NH3 time constant, and an amount of NH3 stored upstream of said SCR catalyst.

18. The dosing control method of claim 17 further comprising determining said expected upstream NH3 absorption and said upstream NH3 time constant based on an exhaust temperature measured upstream of said SCR catalyst and an exhaust flow rate.

19. The dosing control method of claim 14 further comprising:
- estimating an NH3 absorption rate and an NH3 desorption rate for downstream of said SCR catalyst; and
- estimating an NH3 output rate based on said NH3 slip, absorption, and desorption rates,
- wherein said estimating said NH3 rate of change comprises estimating said NH3 rate of change based on said NH3 conversion, supply, oxidation, and output rates.

20. The dosing control method of claim 19 further comprising estimating said NH3 output rate based on a difference between said NH3 absorption rate and a sum of said NH3 desorption and slip rates.

21. The dosing control method of claim 19 further comprising estimating said NH3 absorption and desorption rates based on said NH3 slip rate, an expected downstream NH3 desorption, a downstream NH3 time constant, and an amount of NH3 stored downstream of said SCR catalyst.

22. The dosing control method of claim 21 further comprising determining said expected downstream NH3 desorption and said downstream NH3 time constant based on an exhaust temperature measured downstream of said SCR catalyst and an exhaust flow rate.

23. The dosing control method of claim 14 further comprising estimating said NH3 conversion rate based on a temperature of said SCR catalyst, space velocity of said SCR catalyst, nitrogen oxides (NOx) upstream of said SCR catalyst, a ratio of nitrogen dioxide (NO2) to said NOx, and said NH3 stored by said SCR catalyst.

24. The dosing control method of claim 14 further comprising estimating said NH3 oxidation rate based on a temperature of said SCR catalyst, oxygen upstream of said SCR catalyst, and said NH3 stored by said SCR catalyst.

25. The dosing control method of claim 14 further comprising estimating said NH3 slip rate based on a temperature of said SCR catalyst, space velocity of said SCR catalyst, said NH3 supply rate, and said NH3 stored by said SCR catalyst.

26. The dosing control method of claim 14 further comprising estimating said NH3 rate of change based on a difference between said NH3 supply rate and a sum of said NH3 conversion, oxidation, and slip rates.

* * * * *